(12) United States Patent
Mittal et al.

(10) Patent No.: US 11,095,351 B2
(45) Date of Patent: Aug. 17, 2021

(54) GENERATING A CHANNEL STATE INFORMATION ("CSI") REPORT

(71) Applicant: Lenovo (Singapore) PTE. LTD., New Tech Park (SG)

(72) Inventors: Udar Mittal, Rolling Meadows, IL (US); Tyler Brown, Lake Zurich, IL (US); Ahmed Hindy, Forest Park, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/741,673

(22) Filed: Jan. 13, 2020

(65) Prior Publication Data

US 2020/0228178 A1    Jul. 16, 2020

Related U.S. Application Data

(60) Provisional application No. 62/791,706, filed on Jan. 11, 2019, provisional application No. 62/791,721, filed on Jan. 11, 2019.

(51) Int. Cl.
*H04B 7/06* (2006.01)
*H04B 7/0456* (2017.01)
*H04L 27/26* (2006.01)

(52) U.S. Cl.
CPC ......... *H04B 7/0626* (2013.01); *H04B 7/0456* (2013.01); *H04L 27/2613* (2013.01)

(58) Field of Classification Search
CPC .. H04B 7/0617; H04B 7/0663; H04B 7/0478; H04B 7/0626; H04B 7/0456; H04B 7/0404; H04L 27/2613; H04L 5/0007
See application file for complete search history.

(56) References Cited

U.S. PATENT DOCUMENTS

2016/0142117 A1    5/2016  Rahman et al.
2016/0294457 A1*  10/2016  Lee ...................... H04B 7/0663
(Continued)

OTHER PUBLICATIONS

R1-1813488, "CSI feedback overhead reduction for MU-MIMO enhancements", 3GPP TSG RAN WG1 Meeting #95, Nokia, Nokia Shanghai Bell, Spokane, USA, Nov. 12-16, 2018 (Year: 2018).*
(Continued)

*Primary Examiner* — Aristocratis Fotakis
(74) *Attorney, Agent, or Firm* — Kunzler Bean & Adamson

(57) ABSTRACT

Apparatuses, methods, and systems are disclosed for generating a CSI report. One apparatus includes a transceiver that receives a set of reference signals transmitted from a base station and a processor that transforms the set of reference signals to obtain per-layer vectors of amplitude and phase coefficients of a DFT-compressed codebook. Here, the first element of the amplitude coefficient vector corresponding to one particular beam is unity and the first element of the phase coefficient vector corresponding to the particular beam is zero. The apparatus transmits CSI feedback that includes an indication of one or more elements of the vectors of amplitude coefficient vectors and phase coefficient vectors corresponding to at least one identified beam, and does not include the first element of the amplitude coefficient vector and the first element of the phase coefficient vector corresponding to the particular beam.

16 Claims, 5 Drawing Sheets

(56) References Cited

U.S. PATENT DOCUMENTS

| | | | |
|---|---|---|---|
| 2018/0191411 A1* | 7/2018 | Faxer | H04B 7/0456 |
| 2018/0262246 A1* | 9/2018 | Faxer | H04B 7/0617 |
| 2018/0331746 A1* | 11/2018 | Okuyama | H04B 17/345 |
| 2019/0223117 A1 | 7/2019 | Chai et al. | |
| 2019/0280750 A1* | 9/2019 | Rahman | H04B 7/0469 |
| 2019/0319682 A1 | 10/2019 | Zhang et al. | |
| 2020/0067581 A1 | 2/2020 | Osawa et al. | |
| 2020/0083938 A1* | 3/2020 | Park | H04L 27/2636 |
| 2020/0083939 A1* | 3/2020 | Park | H04L 5/0092 |
| 2020/0106503 A1* | 4/2020 | Yang | H04B 7/0626 |
| 2020/0136682 A1* | 4/2020 | Faxer | H04L 1/00 |
| 2020/0145071 A1* | 5/2020 | Brown | H04B 7/0639 |
| 2020/0177249 A1* | 6/2020 | Ramireddy | H04B 7/0486 |
| 2020/0220591 A1* | 7/2020 | Zhang | H04B 7/046 |
| 2020/0228177 A1 | 7/2020 | Mittal et al. | |
| 2020/0235792 A1* | 7/2020 | Yang | H04B 7/0456 |
| 2020/0252112 A1 | 8/2020 | Zhan et al. | |

OTHER PUBLICATIONS

R1-1813001, CSI enhancement for MU-MIMO, 3GPP TSG RAN WG1 Meeting #95, Samsung, Spokane, USA, Nov. 12-16, 2018 (Year: 2018).*

R1-1813332, Type II CSI feedback overhead reduction, 3GPP TSG RAN WG1 Meeting #95, NTT DOCOMO, Nov. 12-16, 2018 (Year: 2018).*

R1-1812580, Discussions on overhead reduction for Type II codebook, 3GPP TSG RAN WG1 Meeting #95, LG Electronics, Spokane, USA, Nov. 12-16, 2018 (Year: 2018).*

Huawei, Hisilicon, "Introduction of Ue capability constraints", 3GPP TSD-RAN WG2 Meeting#103 R2-1813357, Aug. 20-24, 2018, pp. 1-2.

PCT/IB2020/000044, Notification of Transmittal of the International Search Report and the Written Opinion of the International Searching Authority, or the Declaration, PCT, dated May 12, 2020, pp. 1-15.

PCT/IB2020/000057, Notification of Transmittal of the International Search Report and the Written Opinion of the International Searching Authority, or the Declaration, PCT, dated May 25, 2020, pp. 1-15.

CATT, "Codebook enhancement for advanced CSI", 3GPP TSG RAN WG1 Meeting #87 R1-1611335, Nov. 14-18, 2016, pp. 1-12.

Motorola Mobility / Lenovo, "Considerations on Type II CSI enhancement", 3GPP TSG RAN WG1 Ad-Hoc Meeting 1901 R1-1900943, Jan. 21-25, 2019, pp. 1-15.

Nokia, Nokia Shanghai Bell, "CSIEnhancements for MU-MIMO Support", 3GPP TSG RAN WG1 Meeting #94-bis R1-1811406, Oct. 8-12, 2018, pp. 1-13.

L. Suarez et al., "DFT based Beam-Time Delay Sparse Channel Representation for Channel State Information (CSI) Compression in 5G FDD Massive MIMO Systems", IEEE International Black Sea Conference on Communications and Networking, 2018, pp. 1-6.

NEC, "On the subband definition in CSI Signalling", 3GPP TSG-RAN WG3 Meeting #88 R3-150992, May 25-29, 2015, pp. 1-6.

CATT, "Phase preprocessing for Type II CSI enhancement", 3GPP TSG RAN WG1 Meeting #97 R1-1906348, May 13-17, 2019, pp. 1-4.

Motorola Mobility / Lenovo, "Quantizer Normalization for Type-2 Codebook Compression", 3GPP TSG RAN WG1 Ad-Hoc Meeting 1901 R1-1900945, Jan. 21-25, 2019, pp. 1-5.

Nokia, Nokia Shanghai Bell, "Reduced PMI Payload in the NR Type II Codebooks", 3GPP TSG-RAN WG1 Meeting NR#3 R1-1716505, Sep. 18-21, 2017, pp. 1-5.

Suarez et al., "Reduced Redundancy Indexing for Beam-Time Delay CSICompression in 5G FDD Massive MIMO System", IEEE International Black Sea Conference on Communications and Networking, 2019, pp. 1-5.

Intel Corporation, "Type II CSI feedback compression", 3GPP TSG RAN WG1 Ad-Hoc Meeting 1901 R1-1900501, Jan. 21-25, 2019, pp. 1-15.

Motorola Mobility / Lenovo, "Type II CSI overhead reduction", 3GPP TSG RAN1#95 R1-1813357, Nov. 12-16, 2018, pp. 1-8.

* cited by examiner

GENERATING A CHANNEL STATE INFORMATION ("CSI") REPORT

CROSS-REFERENCE TO RELATED APPLICATIONS

This application claims priority to U.S. Provisional Patent Application No. 62/791,706 entitled "Type-II Codebook Compression Using Phase Modification" and filed on Jan. 11, 2019 for Udar Mittal, Tyler Brown, and Ahmed M. Hindy, and to U.S. Provisional Patent Application No. 62/791,721 entitled "Type-II Codebook Compression Using Phase Modification" and filed on Jan. 11, 2019 for Udar Mittal, Tyler Brown, and Ahmed M. Hindy, which applications are incorporated herein by reference.

FIELD

The subject matter disclosed herein relates generally to wireless communications and more particularly relates to Type-II codebook compression using phase modification of the beams.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Authentication, Authorization and Accounting ("AAA"), Access and Mobility Management Function ("AMF"), Access to Restricted Local Operator Services ("ARLOS"), Positive-Acknowledgment ("ACK"), Application Programming Interface ("API"), Authentication Center ("AuC"), Access Stratum ("AS"), Autonomous Uplink ("AUL"), AUL Downlink Feedback Information ("AUL-DFP"), Base Station ("BS"), Binary Phase Shift Keying ("BPSK"), Bandwidth Part ("BWP"), Clear Channel Assessment ("CCA"), Control Element ("CE"), Cyclic Prefix ("CP"), Cyclical Redundancy Check ("CRC"), Channel State Information ("CSI"), Common Search Space ("CSS"), Connection Mode ("CM", this is a NAS state in 5GS), Core Network ("CN"), Control Plane ("CP"), Data Radio Bearer ("DRB"), Discrete Fourier Transform Spread ("DFTS"), Downlink Control Information ("DCI"), Downlink ("DL"), Downlink Pilot Time Slot ("DwPTS"), Dual Connectivity ("DC"), Dual Registration mode ("DR mode"), Enhanced Clear Channel Assessment ("eCCA"), Enhanced Licensed Assisted Access ("eLAA"), Enhanced Mobile Broadband ("eMBB"), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access ("E-UTRA"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Service ("GPRS"), Generic Public Service Identifier ("GPSI"), Guard Period ("GP"), Global System for Mobile Communications ("GSM"), Globally Unique Temporary UE Identifier ("GUTI"), Hybrid Automatic Repeat Request ("HARQ"), Home Subscriber Server ("HSS"), Home Public Land Mobile Network ("HPLMN"), Information Element ("IE"), Internet-of-Things ("IoT"), International Mobile Subscriber Identity ("IMSI"), Licensed Assisted Access ("LAA"), Load Based Equipment ("LBE"), Listen-Before-Talk ("LBT"), Long Term Evolution ("LTE"), Multiple Access ("MA"), Mobility Management ("MM"), Mobility Management Entity ("MME"), Modulation Coding Scheme ("MCS"), Machine Type Communication ("MTC"), Multiple Input Multiple Output ("MIMO"), Mobile Station International Subscriber Directory Number ("MSISDN"), Multi User Shared Access ("MUSA"), Narrowband ("NB"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Non-Access Stratum ("NAS"), Network Exposure Function ("NEF"), Non-Orthogonal Multiple Access ("NOMA"), Network Slice Selection Assistance Information ("NSSAI"), Operation and Maintenance System ("OAM"), Orthogonal Frequency Division Multiplexing ("OFDM"), Packet Data Unit ("PDU", used in connection with 'PDU Session'), Packet Switched ("PS", e.g., Packet Switched domain or Packet Switched service), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA", similar to tacking area list used in LTE/EPC), Registration Management ("RM", refers to NAS layer procedures and states), Remaining Minimum System Information ("RMSI"), Resource Spread Multiple Access ("RSMA"), Round Trip Time ("RTT"), Receive ("RX"), Radio Link Control ("RLC"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Session Management ("SM"), Session Management Function ("SMF"), Service Provider ("SP"), Signal-to-Interference-Plus-Noise Ratio ("SINR"), Single Network Slice Selection Assistance Information ("S-NSSAI"), Single Registration mode ("SR mode"), Sounding Reference Signal ("SRS"), System Information Block ("SIB"), Synchronization Signal ("SS"), Supplementary Uplink ("SUL"), Subscriber Identification Module ("SIM"), Tracking Area ("TA"), Transport Block ("TB"), Transport Block Size ("TB S"), Time-Division Duplex ("TDD"), Time Division Multiplex ("TDM"), Time Division Orthogonal Cover Code ("TD-OCC"), Transmission Time Interval ("TTI"), Transmit ("TX"), Unified Access Control ("UAC"), Unified Data Management ("UDM"), User Data Repository ("UDR"), Uplink Control Information ("UCI"), User Entity/Equipment (Mobile Terminal) ("UE"), UE Configuration Update ("UCU"), UE Route Selection Policy ("URSP"), Uplink ("UL"), User Plane ("UP"), Universal Mobile Telecommunications System ("UMTS"), UMTS Subscriber Identification Module ("USIM"), UMTS Terrestrial Radio Access ("UTRA"), UMTS Terrestrial Radio Access Network ("UTRAN"), Uplink Pilot Time Slot ("UpPTS"), Ultra-reliability and Low-latency Communications ("URLLC"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In 3GPP New Radio ("NR") systems, Type-1 and Type-II codebook based channel state information ("CSI") feedback have been adopted to support advanced MIMO transmission. Both types of codebooks are constructed from 2-D DFT based grid of beams and enable the CSI feedback of beam selection as well as PSK based co-phase combining between two polarizations. Type-1 codebooks are used for standard resolution CSI feedback, while Type-II (also referred to as "Type-II") codebooks are used for high resolution CSI feedback. As a result, it is envisioned that more accurate CSI can be obtained from Type-II codebook based CSI feedback so that better precoded MIMO transmission can be employed by the network.

One Type-II precoding compression scheme was described based on transforming each beam's frequency-domain precoding vectors to the time domain and selecting a subset of the time-domain components which would then be fed back the gNB. The gNB would then perform the inverse transformation to the frequency domain to determine the set of 2L precoding vectors or beams. However, such feedback has a large overhead.

BRIEF SUMMARY

Disclosed are methods for Type-II codebook compression using phase modification of the beams and/or normalization of taps based on a largest tap of the main beam. Apparatuses and systems also perform the functions of the methods.

One method of a UE device for generating a CSI report includes receiving a set of reference signals transmitted from a base station and identifying a set of beams based on the set of reference signals. The method includes transforming the set of reference signals to obtain per-layer vectors of amplitude and phase coefficients of a Discrete Fourier Transform (DFT)-compressed codebook, each amplitude coefficient vector and phase coefficient vector corresponding to an identified beam. Here, the first element of the amplitude coefficient vector corresponding to one particular beam is unity and the first element of the phase coefficient vector corresponding to the particular beam is zero. The method includes transmitting CSI feedback to the RAN node. Here, the CSI feedback includes an indication of one or more elements of the vectors of amplitude coefficient vectors and phase coefficient vectors corresponding to at least one identified beam. Additionally, the CSI feedback does not include the first element of the amplitude coefficient vector and the first element of the phase coefficient vector corresponding to the particular beam.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
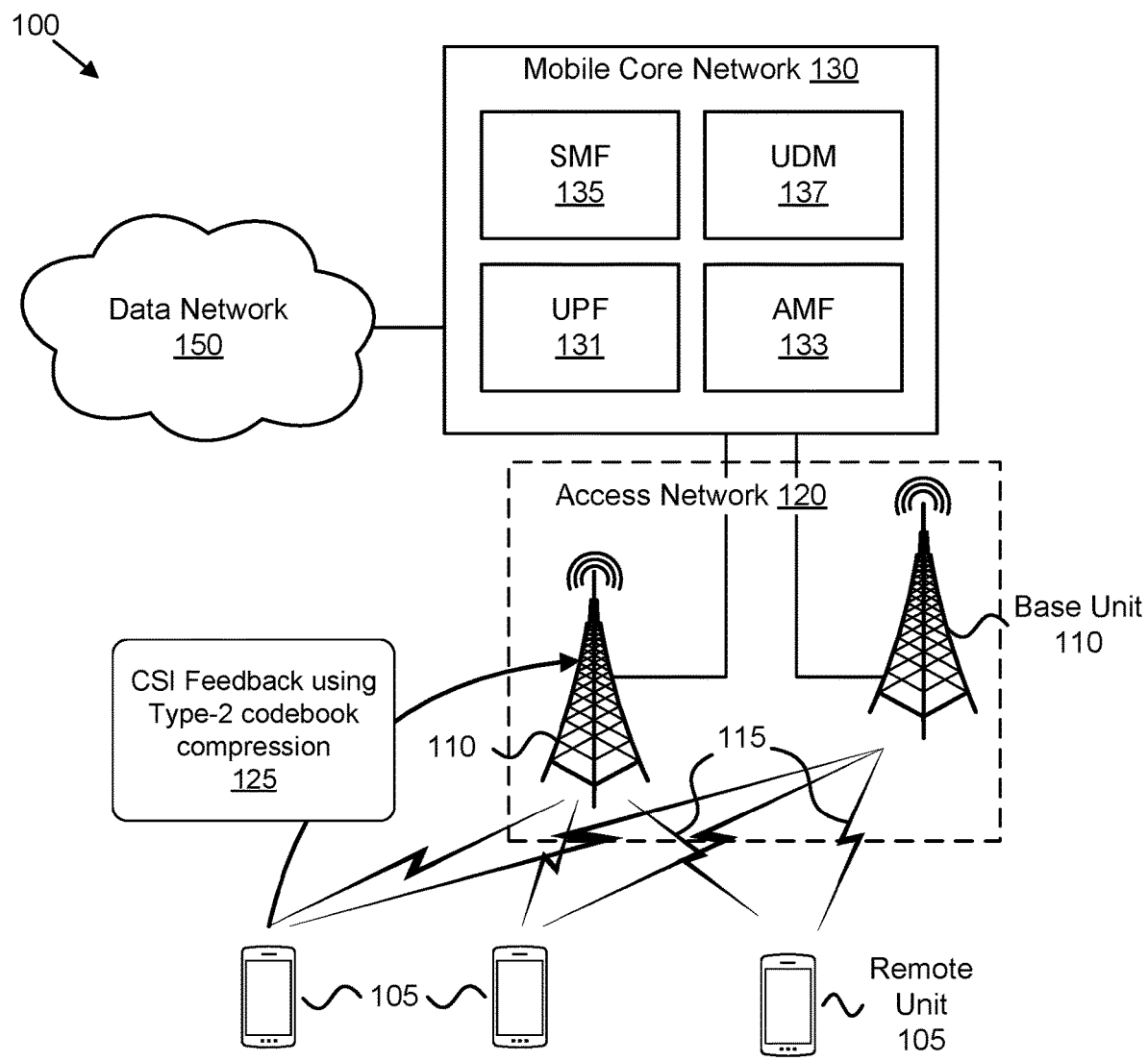
FIG. 1 is a schematic block diagram illustrating one embodiment of a wireless communication system for Type-II codebook compression using phase modification of the beams.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for improved Type-II codebook compression using phase modification of the beams. In Type-II compression, many of these singular vectors are stacked together before a transformation is applied to it. Having a random phase results in failure of the transformation based compression methods. The singular vectors are typically not unique in the sense that any scaling of the singular vector by a unit magnitude complex number is also a singular vector with the same singular value. Thus, the phase of a singular vector is implementation dependent can be presumed to be random. In addition, when the phase ambiguity of the singular-value decomposition's singular vectors causes wasted overhead when coefficients of the singular vectors are reported such as with Type-II codebook compression.

Disclosed herein are techniques for providing a suitable phase assignment to the singular vectors, thereby improving transform-based Type-II codebook compression. Codebook compression improves transmission efficiency because fewer bits need to be sent over the air interface from transmitter (e.g., UE) to receiver (e.g., gNB or other RAN node). To improve DFT-based Type-II codebook compression, the transmitting device (e.g., a UE) identifies a set of beams based on the reference signal and identifies a main beam (e.g., strongest beam) using the absolute sum of the singular vector coefficients. In various embodiments, the transmitting device (e.g., UE) modifies beam phases accordingly, thereby enabling proper normalization for quantization of the taps.

One type of spatial compression scheme determines the set of 2L precoding vectors or beams or basis, where 2L<2Nt. The precoding vector at frequency sub-band k ($0 \leq k <Nsb$) is a linear combination of a subset of a predefined basis (i.e., DFT matrix) per sub-band which cover different spatial directions. Here, Nsb is the number of sub-bands. This technique uses spatial compression to reduce the number of bits reported to be proportional to 2L<2Nt.

If the beam selection matrix is denoted $$W_1 = \begin{bmatrix} B & 0 \\ 0 & B \end{bmatrix}$$

Then the resulting $2N_1N_2 \times N_{sb}$ precoding matrix for a layer can then be expressed as $$W = W_1 \tilde{W}_2^H V \quad \text{Equation (1)}$$

where H means the Hermitian of a matrix, V is the size $N_{sb}$ DFT matrix and $\tilde{W}_2 = [\tilde{W}_{2,1} \; \tilde{W}_{2,2} \ldots \tilde{W}_{2,2L}]$ is comprised of 2L time-domain coefficient vectors of length $N_{sb}$, and $W_2 \triangleq \tilde{W}_2^H V$. W is a set of $2N_1N_2 > 1$ dimensional precoding vectors (each row is a precoding vector), one each for each of $N_{sb}$ sub-bands.

The precoder per layer may be expressed as $$W(k) = W_1 W_2(k) = \begin{bmatrix} B & 0 \\ 0 & B \end{bmatrix} \times \begin{bmatrix} v_{0,k} \\ \ldots \\ v_{2L-1,k} \end{bmatrix} \quad \text{Equation (2)}$$

where the layer-common $W_1$ is $2Nt \times 2L$, the per-layer $W_2(k)$ has size $2L \times 1$ and the columns of the $Nt \times L$ matrix $B = [b_1 \; b_2 \ldots b_{L-1}]$ are columns of a size-Nt standard two-dimensional DFT matrix.

Another Type-II precoding compression scheme transforms a subset of the beam's frequency-domain precoding vectors to the time domain and selects a subset of the time-domain components which would then be fed back the RAN node. The RAN node then performs the inverse transformation back to the frequency domain to determine the set of precoding vectors or beams. The subset of predefined precoding vectors cover different frequency sub-bands. Here, the UE reports: 1) L DFT special basis indices (where L<Nt), 2) M DFT frequency-domain basis indices (where M<Nsb), and 3) 2L×M number of linear combinatorial coefficients (i.e., complex coefficients having both amplitude and phase). This technique uses both spatial compression and frequency compression to reduce the number of bits reported as 2LM<2LNsb<2NtNsb.

The precoder per layer may be expressed as:

$$W = W_1 \tilde{w}_2 W_3^H = \begin{bmatrix} B & 0 \\ 0 & B \end{bmatrix} \times \begin{bmatrix} \tilde{v}_{0,0} & \ldots \\ \ldots & \tilde{v}_{2L-1,M-1} \end{bmatrix} W_3^H. \quad \text{Equation (3)}$$

In Equation 3, B is the same over all layers. Here $\tilde{W}_2$ is reported by layer with size 2L×M and the columns of the Nsb×M matrix $W_3 = [f_0 \ldots f_{M-1}]$ are columns of a size-Nsb standard DFT matrix, also reported per layer.

For $\tilde{W}_2$, the element $\tilde{v}_{l,m}$ represents the quantized amplitude and phase of the coefficient. In certain embodiments, the single vector coefficients may be quantized using multi-stage quantization techniques described in US Provisional Patent Application No. 62/791,721. In other embodiments, traditional quantization techniques may be used.

First, compute $W_1$ given the channel matrix ($H_{sb}$) for each of the $N_{sb}$ sub-bands.

Second, compute $W_2$ using the estimate of the channel matrix ($H_{sb}$) and $W_1$. This step requires finding the singular vectors corresponding to the highest (e.g., largest) singular value of the equivalent channel matrices $H_{sb}W_1$ for each sub-band. Each column of $W_2$ is the singular vector of one sub-band.

Second, $\tilde{W}_2$, can be computed by taking the inverse Fourier transform of the rows of $W_2$ i.e., $$\tilde{W}_2 = V W_2^H \quad \text{Equation (4)}$$

The elements of in $\tilde{W}_2$ are referred herein as "taps." Feedback overhead may be reduced when the UE feeds back an indication of non-zero subset of the coefficients in $\tilde{W}_2$, e.g., those coefficients with the largest magnitudes. The feedback overhead also depends on how many quantization bits are used to represent these coefficients.

As mentioned above, the singular vectors are not unique and random phases associated with the singular vectors may result in poor performance of the Type-II precoding compression scheme. Providing a proper phase to the singular vectors not only improves the compressibility of the stacked singular vectors but also improves the normalization precision of the quantizer.

FIG. 1 depicts an embodiment of a wireless communication system 100 Type-II codebook compression, according to various embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the NR system specified in the 3GPP specifications and/or the LTE system specified in 3GPP. More generally, however, the wireless communication system 100 may implement some other open or proprietary communication network, for example, WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL,") and downlink ("DL") communication signals. Furthermore, the UL and DL communication signals may be carried over the communication links 115.

The base units 110 may be distributed over a geographic region. In certain embodiments, a base unit 110 may also be referred to as a RAN node, an access terminal, a base, a base station, a Node-B, an eNB, a gNB, a Home Node-B, a relay node, a femtocell, an access point, a device, or by any other terminology used in the art. The base units 110 are generally part of an access network 120, such as a radio access network ("RAN"), that may include one or more controllers communicably coupled to one or more corresponding base units 110. These and other elements of the access network 120 are not illustrated but are well known generally by those having ordinary skill in the art. The base units 110 connect to the mobile core network 130 via the access network 120. The access network 120 and mobile core network 130 may be collectively referred to herein as a "mobile network" or "mobile communication network."

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC") or the evolved packet core ("EPC"), which may be coupled to other data network 150, like the Internet and private data networks, among other data networks. Each mobile core network 130 belongs to a single public land mobile network ("PLMN"). The present disclosure is not intended to be limited to the implementation of any particular wireless communication system architecture or protocol. For example, other embodiments of the mobile core network 130 include an enhanced packet core ("EPC") or a Multi-Service Core as described by the Broadband Forum ("BBF").

The mobile core network 130 includes several network functions ("NFs"). As depicted, the mobile core network 130 includes an access and mobility management function ("AMF") 133, a session management function ("SMF") 135, and a user plane function ("UPF") 131. Although a specific number of AMFs 133, SMFs 135, and UPFs 131 are depicted in FIG. 1, one of skill in the art will recognize that any number and type of network function may be included in the mobile core network 130.

The AMF 133 provides services such as UE registration, UE connection management, and UE mobility management. The SMF 135 manages the data sessions of the remote units 105, such as a PDU session. The UPF 131 provides user plane (e.g., data) services to the remote units 105. A data connection between the remote unit 105 and a data network 150 is managed by a UPF 131. The UDM 137 provides user identification handling, access authorization, subscription management, etc.

To support spatial multiplexing and MU-MIMO, the remote unit 105 provides CSI feedback 125 to the base unit 110 using Type-II codebook compression using phase modification of the beams. The remote unit 105 generates a set of modified channel matrix ($H_{sb}$ $W_1$), where ($H_{sb}$) is an estimate of channel matrices for a set of sub-bands and ($W_1$) is the beam space matrix. The remote unit 105 also generates a set of singular vector coefficients ($W_2$) from the modified channel matrix.

The remote unit 105 finds the main beam based on the sum of absolute value of singular vector coefficients and sets the phase of all singular vector coefficients based on the phase of the main beam singular vector coefficients, as described in greater detail below.

When computing the matrix $W_2$, scaling each element of the singular vector with a unit magnitude complex scalar coefficient will keep the magnitude of the singular vector the same and it will still remain a singular vector with the same singular value. Because the phase of the singular vector is very much implementation dependent and because the singular vector is determined independently for all the sub-bands, depending upon the implementation, this phase can be presumed to be random from sub-band to sub-band. Observation shows that the Fourier-transform based quantization approach (described above) does not perform well when this phase is random.

To remedy, the phase of each column of $W_2$ may be changed as needed to provide a certain structure which helps in quantization later. Because $W_2$ is obtained from singular vectors, the elements of $W_2$ are referred to as "singular vector coefficients" of the modified channel.

In various embodiments, the remote unit 105 uses a transformation approach to matrix $W_2$, such that the first tap of the main beam has the largest magnitude among all other taps and hence can be suitably used for normalization. Note that each beam populates a row of the matrix $W_2$. First the remote unit 105 determines the main beam based on the absolute values of the singular vector coefficients. In various embodiments, the main beam is the particular beam having the strongest tap. One or more matrix transformation techniques may be used in order to force the largest magnitude coefficient of the main beam into the first column (i.e., remap the columns of $W_2$), thus becoming the first tap of the main beam. Note that in other embodiments, the largest magnitude coefficient of the main beam is not forced into the first column, but the index pair (row and column) of the largest magnitude coefficient of the main beam is reported.

Additionally, the remote unit 105 transforms the matrix $W_2$ to zero-out the phase of the main beam. This enables normalization of all the taps with respect to the first tap of the main beam before quantization. Let m be the index of the main beam.

First, set the phase of all the $N_{sb}$ terms of the m-th column of $W_2$ to zero. Let $\alpha_{ij}$ be the amplitude, and $\phi_{ij}$ be the phase of ijth element of $W_2$, i.e., the ijth element of $W_2$ is given by:

$$W_{2ij} = \alpha_{ij} \exp(\sqrt{-1}\phi_{ij}) \qquad \text{Equation (5)}$$

To zero out the phase of the main beam, the phases of all the beams are offset relative to the first tap (strongest tap) by subtracting the phase of the main beam from the original phases of that beam. This subtraction is performed over all sub-bands, i.e., the new phase values of $W_2$ are now given by $$\phi'_{ij} = \phi_{ij} - \phi_{im} \qquad \text{Equation (6)}$$

Now the ij-th element becomes $$W_{2ij} = \alpha_{ij} \exp(\sqrt{-1}(\phi_{ij}-\phi_{im})) = \alpha_{ij} \exp(\sqrt{-1}\phi'_{ij})) \qquad \text{Equation (7)}$$

For the main beam these elements are non-negative real numbers given by $$W_{2im} = \alpha_{im} \qquad \text{Equation (8)}$$

Note that in equation 8, the element $W_{2im}$ has a phase of zero. Because all the Nsb elements corresponding to the main beam of $W_2$ has zero phase and $\tilde{W}_2 = VW_2$, the ij-th taps are computed as:

$$\tilde{w}_{2ij} = \sum_{k=1}^{Nsb} \alpha_{kj} \exp\left(\sqrt{-1}\left(\phi'_{kj} + 2\pi\frac{ik}{N_{sb}}\right)\right) \qquad \text{Equation (9a)}$$

and for the main beam the tap becomes $$\tilde{w}_{2im} = \sum_{k=1}^{Nsb} \alpha_{km} \exp\left(\sqrt{-1}\, 2\pi\frac{ik}{N_{sb}}\right). \qquad \text{Equation (9b)}$$

The zero-th tap of the main beam now becomes $$\tilde{W}_{20m} = \Sigma_{k=1}^{Nsb} \alpha_{km} \qquad \text{Equation (10)}$$

Now if the main beam index m is selected using the magnitude sum of the elements of the stacked singular vectors such that $$m = \underset{j}{\text{argmax}} \left(\sum_{i=1}^{Nsb} \alpha_{ij}\right) \qquad \text{Equation (11)}$$

then the first-tap which is equal to $\Sigma_{i=1}^{Nsb} \alpha_{im}$ becomes the largest over all possible taps over all the beams. Note that even for the main beam all other taps have smaller magnitude compared with the first tap. This can be easily proven by treating the inverse Fourier transform as a summation of $N_{sb}$ 2-dimensional vectors. The vector summation is maximum if and only if all vectors have the same direction.

Very often the taps may be computed using an oversampling. The tap value at an oversampled location i' (i' not an integer) are obtained as $$\tilde{w}_2(i', j) = \sum_{k=1}^{Nsb} \alpha_{kj} \exp\left(\sqrt{-1}\left(\phi'_{kj} + 2\pi\frac{i'k}{N_{sb}}\right)\right), \qquad \text{Equation (12)}$$

It can also be shown that choosing the main beam using Equation 12 and zeroing out its phase ensures also ensures that first-tap of the main beam is the strongest tap. Next normalization is performed using the first-tap of the main beam, i.e., $$\tilde{w}_{2ij} = \frac{\tilde{w}_{2ij}}{\tilde{w}_{20m}} \qquad \text{Equation (13)}$$

Such transformation forces the magnitude of the first tap of the main beam to unity $$\left(e.g., \frac{\tilde{w}_{20m}}{\tilde{w}_{20m}} = 1\right).$$

Thus, there is no need to explicitly quantize the first tap of the main beam because the value of this tap can be directly inferred to be 1 and its phase can be inferred as zero. Release 16 Type II CSI specifies reporting of the strongest taps of each beam and such reporting generally consist of an amplitude and a phase. Because the first tap, which will always be included due to its maximum amplitude condition, can be inferred to be 1, it need not be reported, thereby saving precious uplink control signaling overhead.

In various embodiments, only the index of the main beam (i.e., the beam containing the strongest coefficient) is reported to the RAN node (e.g., gNB). Thus, the CSI feedback sent to the RAN node does not include the first element of the amplitude coefficient vector and the first element of the phase coefficient vector corresponding to the particular beam, but includes indications of one or more elements of the vectors of amplitude coefficient vectors and phase coefficient vectors corresponding to the identified beams.

Furthermore, going back to Equation 9a, it can be easily seen the i-th tap of the main beam is complex conjugate of the $N_{sb}$-i tap, i.e., $$\tilde{W}_{2im} = \tilde{W}_{2(Nsb-i)m}^* \qquad \text{Equation (14)}$$

where * is a complex conjugate operation. Equation 14 enables the transmitter (UE) to quantize and transmit only one half of the main beam taps, because the second half of the taps can be obtained at the receiver/decoder (gNB) using this symmetric property. Similarly, if only a subset of taps are reported on either a common or independent basis (same or different set of taps across beams respectively), the number of possibilities for the combinations of taps is reduced because approximately half the taps are pairs, which means the number of possibilities is approximately cut in half. This also reduces the uplink signaling overhead. However, such a reporting advantage can be taken only in case when tap reporting is independent over all the beams. In the case of common basis reporting, the reporting has to be over an entire range to taps. However, the decoder (gNB) can improve the precoding vector by generating extra taps for the main beam if the reported taps do not follow symmetricity, i.e., i-th tap is reported but $N_{sb}-i$ is not reported by UE to gNB.

In some embodiments, an upsampling factor is to be reported for all the beams by choosing a fractional part which results in maximum tap value for that beam, then for the main beam the fractional component will always be zero so again there is no need to report the fractional part for the main beam.

Beneficially, normalization with the first tap of the main beam generates good range for quantization of other taps. Additionally, such normalization always results in the first tap of the main beam being '1', so there is no need to report this value. Further, there is no need to specific one of the one of the strongest tap, it will always be the first tap of the main beam and the oversampling factor for the main beam will always be '0'. As noted above, using zero phase for the main beam, results in the coefficients before inverse Fourier transform being real and hence the column of $\tilde{W}_2$ corresponding to the main beam will be symmetric and the quantization method can advantageously use this property to report only half of the main beam taps.

Figure 2:
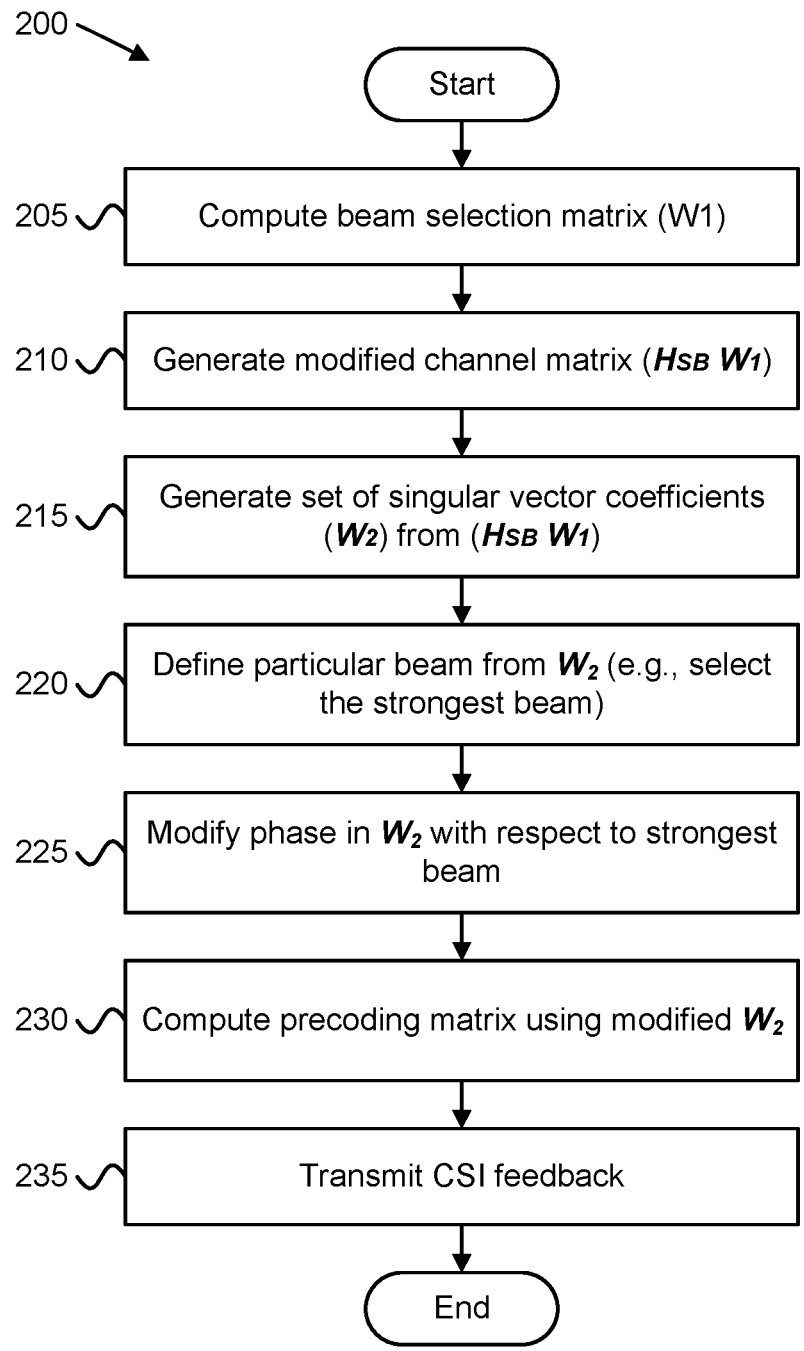
FIG. 2 is a diagram illustrating one embodiment of a procedure for Type-II codebook compression using phase modification of the beams.

FIG. 2 depicts a first procedure 200 for Type-II codebook compression using phase modification of the beams, according to embodiments of the disclosure. The procedure 200 may be performed by a UE, such as the remote unit 105. The procedure 200 begins as the UE computes 205 the beam selection matrix ($W_1$) and generates 210 the modified channel matrix ($H_{sb}W_1$), as described above. Additionally, the UE generates 215 a set of singular vector coefficients (i.e., matrix $W_2$) from the modified channel matrix and defines 220 a particular beam (i.e., main beam) based on the singular vector coefficients. In various embodiments, the particular beam is selected based on based on the sum of absolute value of singular vector coefficients.

The UE modifies 225 the phase of all singular vector coefficients based on the phase of the main beam singular vector coefficients. As discussed above, phase modification solves the issue of random phases causing poor performance of the Discrete Fourier Transformation-based Type-II codebook compression. The UE computes 230 the pre-coding matrix using the modified singular vector coefficients and transmits 235 CSI feedback to the decoder (e.g., gNB).

Figure 3:
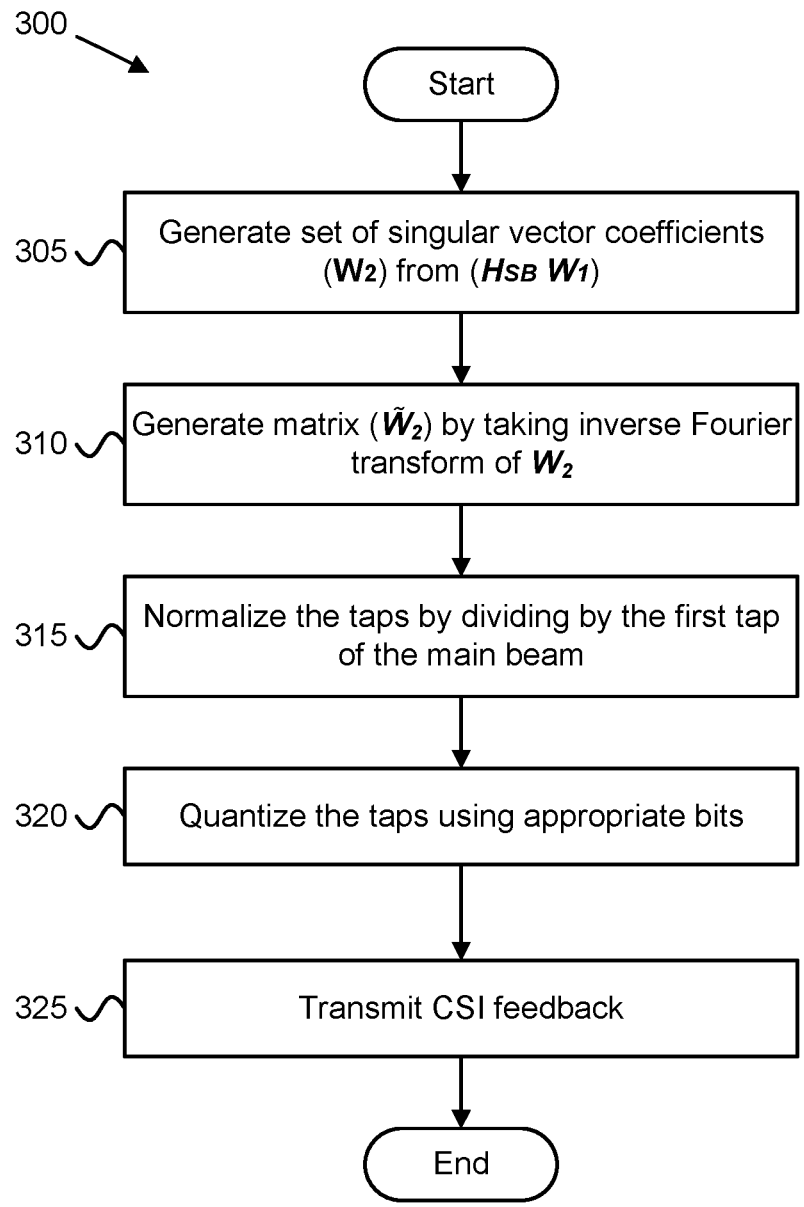
FIG. 3 is a diagram illustrating another embodiment of a procedure for Type-II codebook compression using tap normalization.

FIG. 3 depicts a second procedure 300 for Type-II codebook compression using phase modification of the beams, according to embodiments of the disclosure. The procedure 300 may be performed by a UE, such as the remote unit 105. The procedure 300 begins as UE generates 305 a set of singular vector coefficients ($W_2$) from the modified channel matrix ($H_{sb}W_1$), as described above. The UE generates 310 the matrix ($\tilde{W}_2$) by performing an inverse Fourier transform of $W_2$, e.g., to generate the taps. Further, the UE normalizes 315 the taps by dividing by the first tap of the main beam and quantizes 320 the taps using appropriate bits. In certain embodiments, quantizing the taps includes quantizing only half of the taps, wherein the decoder uses the symmetric property to generate the other taps. The UE further transmits 325 CSI feedback (e.g., pre-coding matrix) to the decoder (e.g., gNB).

Figure 4:
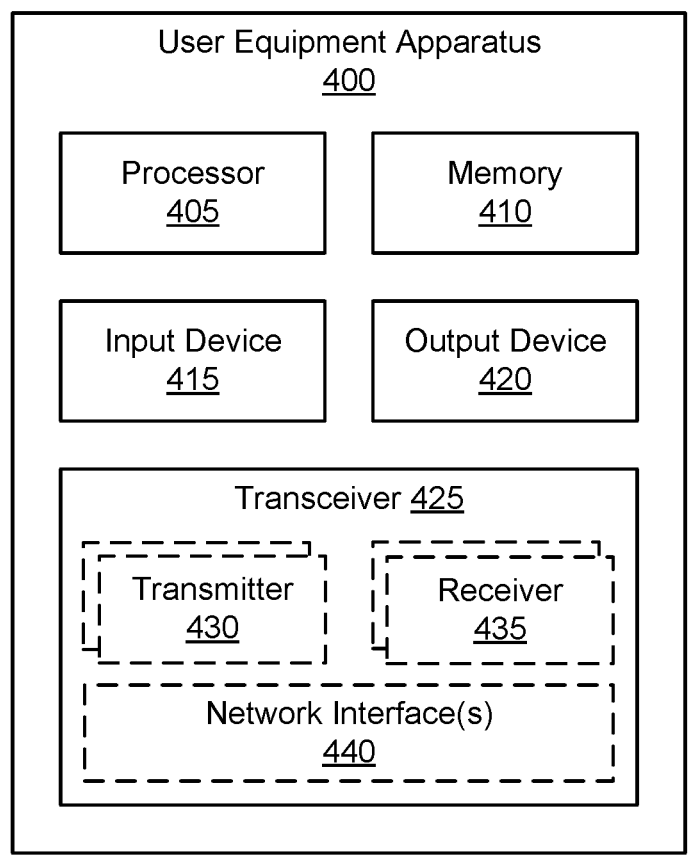
FIG. 4 is a schematic block diagram illustrating one embodiment of a user equipment apparatus for generating a CSI report.

FIG. 4 depicts a user equipment apparatus 400 that may be used for Type-II codebook compression using phase modification of the beams, according to embodiments of the disclosure. The UE. In various embodiments, the user equipment apparatus 400 is used to implement one or more of the solutions described above. The user equipment apparatus 400 may be one embodiment of the remote unit 105, described above. Furthermore, the user equipment apparatus 400 may include a processor 405, a memory 410, an input device 415, an output device 420, and a transceiver 425. In some embodiments, the input device 415 and the output device 420 are combined into a single device, such as a touchscreen. In certain embodiments, the user equipment apparatus 400 may not include any input device 415 and/or output device 420. In various embodiments, the user equipment apparatus 400 may include one or more of: the processor 405, the memory 410, and the transceiver 425, and may not include the input device 415 and/or the output device 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the transceiver 425 receives a set of reference signals and the processor 405 identifies a set of beams based on the set of reference signals. The processor 405 transforms the set of reference signals to obtain per-layer vectors of amplitude and phase coefficients of a Discrete Fourier Transform (DFT)-compressed codebook, each amplitude coefficient vector and phase coefficient vector corresponding to an identified beam. Here, the first element of the amplitude coefficient vector corresponding to one particular beam is unity and the first element of the phase coefficient vector corresponding to the particular beam is zero.

In some embodiments, the first element of the amplitude coefficient vector corresponding to the particular beam is the greater than or equal to each of the elements of the amplitude coefficient vectors corresponding to all identified beams.

In some embodiments, transforming the set of reference signals includes the processor 405 performing a Fourier-based transformation comprising at least one of: a DFT and an inverse DFT. In such embodiments, transforming the set of reference signals to obtain vectors of amplitude and phase coefficients of a DFT-compressed codebook may include the processor 405 performing a phase offset operation prior to the Fourier-based transformation, the phase offset operation based on the phase of the particular beam. In certain embodiments, the processor 405 identifies the particular beam based on a summation of the magnitude values of elements of input vectors. Note here that the input vectors are input to the Fourier-based transformation, wherein each input vector corresponds to an identified beam.

In some embodiments, transforming the set of reference signals includes the processor 405 normalizing amplitude coefficient vectors of the identified set of beams based on the first element of the amplitude coefficient vector of the particular beam. In some embodiments, transforming the set of reference signals includes the processor 405 subtracting the first element of the phase coefficient vector of the particular beam from the phases of the identified set of beams. In some embodiments, transforming the set of reference signals includes the processor 405 quantizing the amplitude and phase coefficients of the identified set of beams.

Via the transceiver 425, the processor 405 transmits CSI feedback to the base station, wherein the CSI feedback comprises an indication of one or more elements of the vectors of amplitude coefficient vectors and phase coefficient vectors corresponding to at least one identified beam, wherein the CSI feedback does not include the first element of the amplitude coefficient vector and the first element of the phase coefficient vector corresponding to the particular beam.

In some embodiments, the processor 405 reports an index corresponding to the particular beam. For example, the CSI feedback may include an indication of the beam index of the particular beam. In such embodiments, the reported index may be identified based on a summation of the magnitude values of elements of input vectors, wherein the input vectors are input to the Fourier-based transformation, and wherein each input vector corresponds to an identified beam.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to Type-II codebook compression using phase modification of the beams. In certain embodiments, the memory 410 also stores program code and related data, such as an operating system or other controller algorithms operating on the remote unit 105.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the user equipment apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

In various embodiments, the transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages.

The transceiver 425 may include one or more transmitters 430 and one or more receivers 435. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an ASIC, or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

Figure 5:
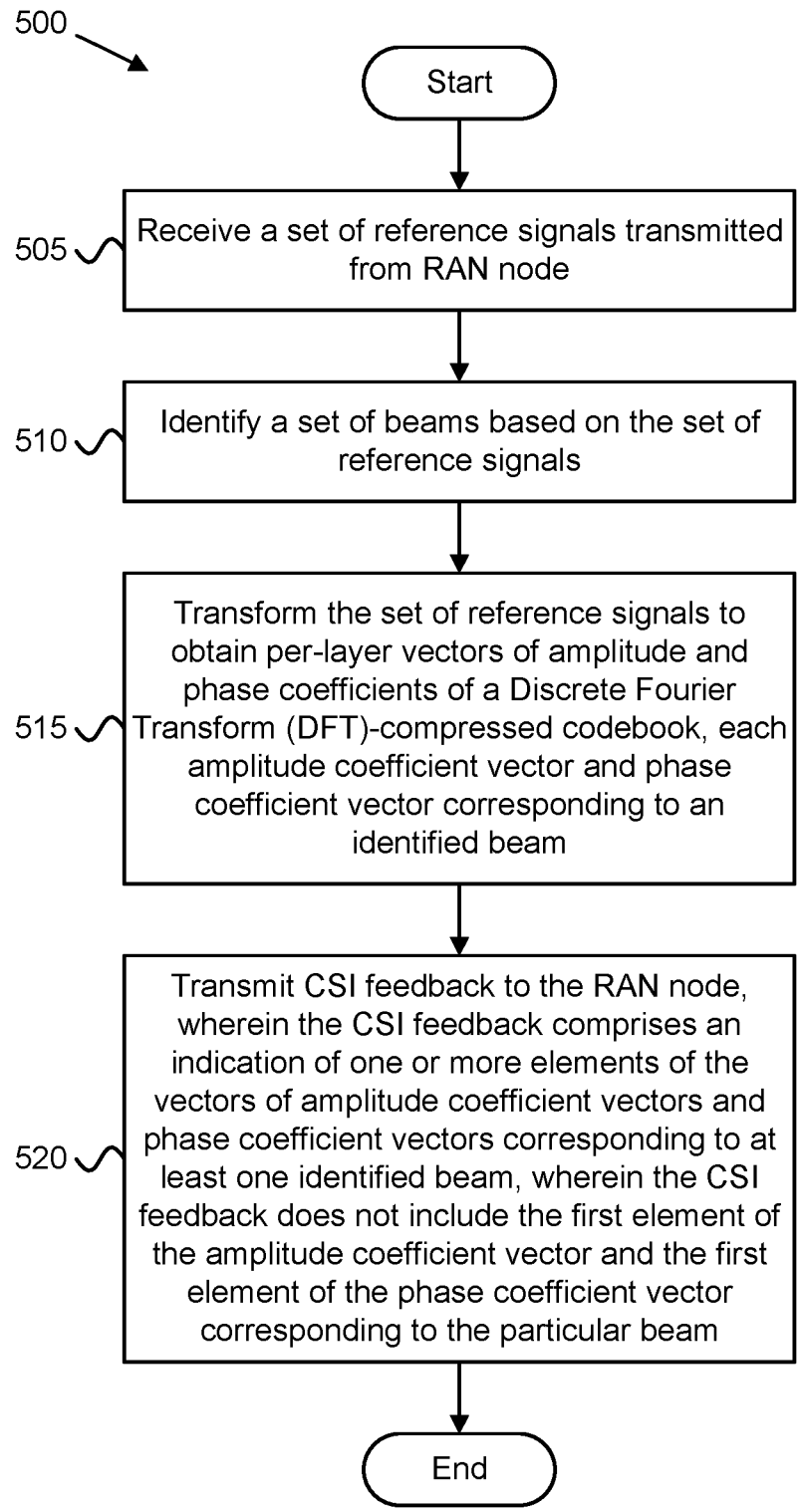
FIG. 5 is a flow chart diagram illustrating one embodiment of a method for generating a CSI report.

FIG. 5 depicts one embodiment of a method 500 for generating a CSI report, according to embodiments of the disclosure. In various embodiments, the method 500 is performed by the remote unit 105 and/or the user equipment apparatus 400, described above. In some embodiments, the method 500 is performed by a processor, such as a microcontroller, a microprocessor, a central processing unit (CPU), a graphics processing unit (GPU), an auxiliary processing unit, a FPGA, or the like.

The method 500 begins and receives 505 a set of reference signals transmitted from a RAN node. The method 500 includes identifying 510 a set of beams based on the set of reference signals.

The method 500 includes transforming 515 the set of reference signals to obtain per-layer vectors of amplitude and phase coefficients of a Discrete Fourier Transform (DFT)-compressed codebook, each amplitude coefficient vector and phase coefficient vector corresponding to an identified beam. Here, the first element of the amplitude coefficient vector corresponding to one particular beam is unity and the first element of the phase coefficient vector corresponding to the particular beam is zero.

In some embodiments, transforming 515 the set of reference signals includes performing a Fourier-based transformation comprising at least one of: a DFT and an inverse DFT. In such embodiments, transforming the set of reference signals to obtain vectors of amplitude and phase coefficients of a DFT-compressed codebook may include a phase offset operation prior to the Fourier-based transformation, the phase offset operation based on the phase of the particular beam. In various embodiments, the particular beam is identified based on a summation of the magnitude values of elements of input vectors, wherein the input vectors are input to the Fourier-based transformation, and wherein each input vector corresponds to an identified beam.

In some embodiments, transforming 515 the set of reference signals includes normalizing amplitude coefficient vectors of the identified set of beams based on the first element of the amplitude coefficient vector of the particular beam. In some embodiments, transforming 515 the set of reference signals includes subtracting the first element of the phase coefficient vector of the particular beam from the phases of the identified set of beams. In some embodiments, transforming 515 the set of reference signals includes quantizing the amplitude and phase coefficients of the identified set of beams. In various embodiments, the first element of the amplitude coefficient vector corresponding to the particular beam is greater than or equal to each of the elements of the amplitude coefficient vectors corresponding to all identified beams.

The method 500 includes transmitting 520 CSI feedback to the RAN node. Here, the CSI feedback includes an indication of one or more elements of the vectors of amplitude coefficient vectors and phase coefficient vectors corresponding to at least one identified beam. Additionally, the CSI feedback does not include the first element of the amplitude coefficient vector and the first element of the phase coefficient vector corresponding to the particular beam. The method 500 ends.

In some embodiments, transmitting 520 CSI feedback to the RAN node includes reporting an index corresponding to the particular beam. In one embodiment, the reported index is identified based on a summation of the magnitude values of elements of input vectors, wherein the input vectors are input to the Fourier-based transformation, and wherein each input vector corresponds to an identified beam.

Disclosed herein is a first apparatus for generating a CSI report, according to embodiments of the disclosure. The first apparatus may be implemented by a UE device using Discrete Fourier Transformation-based Type-II codebook compression, such as the remote unit 105 and/or the user equipment apparatus 400. The first apparatus includes a transceiver that receives a set of reference signals transmitted from a base station and a processor that identifies a set of beams based on the set of reference signals. The processor transforms the set of reference signals to obtain per-layer vectors of amplitude and phase coefficients of a Discrete Fourier Transform (DFT)-compressed codebook, each amplitude coefficient vector and phase coefficient vector corresponding to an identified beam. Here, the first element of the amplitude coefficient vector corresponding to one particular beam is unity and the first element of the phase coefficient vector corresponding to the particular beam is zero. Via the transceiver, the processor transmits CSI feedback to the base station, wherein the CSI feedback comprises an indication of one or more elements of the vectors of amplitude coefficient vectors and phase coefficient vectors corresponding to at least one identified beam, wherein the CSI feedback does not include the first element of the amplitude coefficient vector and the first element of the phase coefficient vector corresponding to the particular beam.

In some embodiments, the first element of the amplitude coefficient vector corresponding to the particular beam is the greater than or equal to each of the elements of the amplitude coefficient vectors corresponding to all identified beams.

In some embodiments, transforming the set of reference signals includes performing a Fourier-based transformation comprising at least one of: a DFT and an inverse DFT. In such embodiments, transforming the set of reference signals to obtain vectors of amplitude and phase coefficients of a DFT-compressed codebook may include a phase offset operation prior to the Fourier-based transformation, the phase offset operation based on the phase of the particular beam. In certain embodiments, the particular beam is identified based on a summation of the magnitude values of elements of input vectors, wherein the input vectors are input to the Fourier-based transformation, and wherein each input vector corresponds to an identified beam.

In some embodiments, the processor reports an index corresponding to the particular beam. For example, the CSI feedback may include an indication of the beam index of the particular beam. In such embodiments, the reported index may be identified based on a summation of the magnitude values of elements of input vectors, wherein the input vectors are input to the Fourier-based transformation, and wherein each input vector corresponds to an identified beam.

In some embodiments, transforming the set of reference signals includes normalizing amplitude coefficient vectors of the identified set of beams based on the first element of the amplitude coefficient vector of the particular beam. In some embodiments, transforming the set of reference signals includes subtracting the first element of the phase coefficient vector of the particular beam from the phases of the identified set of beams. In some embodiments, transforming the set of reference signals includes quantizing the amplitude and phase coefficients of the identified set of beams.

Disclosed herein is a first method for generating a CSI report, according to embodiments of the disclosure. The first method may be performed by a UE device for Type-II codebook compression using a Discrete Fourier Transformation-based Type-II codebook compression, such as the remote unit 105 and/or the user equipment apparatus 800. The first method includes receiving a set of reference signals transmitted from a base station and identifying a set of beams based on the set of reference signals. The first method includes transforming the set of reference signals to obtain per-layer vectors of amplitude and phase coefficients of a Discrete Fourier Transform (DFT)-compressed codebook, each amplitude coefficient vector and phase coefficient vector corresponding to an identified beam. Here, the first element of the amplitude coefficient vector corresponding to one particular beam is unity and the first element of the phase coefficient vector corresponding to the particular beam is zero. The method includes transmitting CSI feedback to the RAN node. Here, the CSI feedback includes an indication of one or more elements of the vectors of amplitude coefficient vectors and phase coefficient vectors corresponding to at least one identified beam. Additionally, the CSI feedback does not include the first element of the amplitude coefficient vector and the first element of the phase coefficient vector corresponding to the particular beam.

In some embodiments, the first element of the amplitude coefficient vector corresponding to the particular beam is greater than or equal to each of the elements of the amplitude coefficient vectors corresponding to all identified beams.

In some embodiments, transforming the set of reference signals includes performing a Fourier-based transformation comprising at least one of: a DFT and an inverse DFT. In such embodiments, transforming the set of reference signals to obtain vectors of amplitude and phase coefficients of a DFT-compressed codebook may include performing a phase offset operation prior to the Fourier-based transformation, the phase offset operation based on the phase of the particular beam. In certain embodiments, the particular beam is identified based on a summation of the magnitude values of elements of input vectors, wherein the input vectors are input to the Fourier-based transformation, and wherein each input vector corresponds to an identified beam.

In some embodiments, the first method includes reporting an index corresponding to the particular beam. In certain embodiments, the reported index is identified based on a summation of the magnitude values of elements of input vectors, wherein the input vectors are input to the Fourier-based transformation, and wherein each input vector corresponds to an identified beam.

In some embodiments, transforming the set of reference signals includes normalizing amplitude coefficient vectors of the identified set of beams based on the first element of the amplitude coefficient vector of the particular beam. In some embodiments, transforming the set of reference signals includes subtracting the first element of the phase coefficient vector of the particular beam from the phases of the identified set of beams. In some embodiments, transforming the set of reference signals includes quantizing the amplitude and phase coefficients of the identified set of beams.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method in a user equipment for generating a channel state information ("CSI") report, the method comprising:
receiving a set of reference signals transmitted from a base station;
identifying a set of beams based on the set of reference signals;
transforming the set of reference signals to obtain per-layer vectors of amplitude and phase coefficients of a Discrete Fourier Transform (DFT)-compressed codebook, each amplitude coefficient vector and phase coefficient vector corresponding to a tap in at least one identified beam,
wherein transforming the set of reference signals includes performing a Fourier-based transformation comprising at least one of: a DFT and an inverse DFT,
wherein transforming the set of reference signals to obtain vectors of amplitude and phase coefficients of a DFT-compressed codebook comprises performing a phase offset operation on the set of beams prior to the Fourier-based transformation, the phase offset operation based on a phase of a particular beam,
wherein a first element of the amplitude coefficient vector corresponding to the particular beam is unity, and
wherein the first element of the phase coefficient vector corresponding to the particular beam is zero; and
calculating no more than half of the taps for the at least one identified beam, wherein an i-th tap of the at least one identified beam is a complex conjugate of a tap for a number of subbands minus i, wherein each tap is an inverse Fourier transform of rows of time-domain coefficient vectors;
transmitting CSI feedback comprising the calculated taps to the base station, wherein the CSI feedback comprises an indication of one or more elements of the vectors of amplitude coefficient vectors and phase coefficient vectors corresponding to the at least one identified beam, wherein the CSI feedback does not include the first element of the amplitude coefficient vector and the first element of the phase coefficient vector corresponding to the particular beam.

2. The method of claim 1, wherein the first element of the amplitude coefficient vector corresponding to the particular beam is greater than or equal to each of the elements of the amplitude coefficient vectors corresponding to all identified beams.

3. The method of claim 1, further comprising reporting an index corresponding to the particular beam.

4. The method of claim 3, wherein the reported index is identified based on a summation of the magnitude values of elements of input vectors, wherein the input vectors are input to the Fourier-based transformation, and wherein each input vector corresponds to an identified beam.

5. The method of claim 1, wherein the particular beam is identified based on a summation of the magnitude values of elements of input vectors, wherein the input vectors are input to the Fourier-based transformation, and wherein each input vector corresponds to an identified beam.

6. The method of claim 1, wherein transforming the set of reference signals includes normalizing amplitude coefficient vectors of the identified set of beams based on the first element of the amplitude coefficient vector of the particular beam.

7. The method of claim 1, wherein transforming the set of reference signals includes subtracting the first element of the phase coefficient vector of the particular beam from the phases of the identified set of beams.

8. The method of claim 1, wherein transforming the set of reference signals includes quantizing the amplitude and phase coefficients of the identified set of beams.

9. A user equipment ("UE") apparatus for generating a channel state information ("CSI") report, the apparatus comprising:
a transceiver that receives a set of reference signals transmitted from a base station; and
a processor that:
identifies a set of beams based on the set of reference signals;

transforms the set of reference signals to obtain per-layer vectors of amplitude and phase coefficients of a Discrete Fourier Transform (DFT)-compressed codebook, each amplitude coefficient vector and phase coefficient vector corresponding to a tap in at least one identified beam,
  wherein transforming the set of reference signals includes performing a Fourier-based transformation comprising at least one of: a DFT and an inverse DFT,
  wherein transforming the set of reference signals to obtain vectors of amplitude and phase coefficients of a DFT-compressed codebook comprises performing a phase offset operation on the set of beams prior to the Fourier-based transformation, the phase offset operation based on a phase of a particular beam,
  wherein a first element of the amplitude coefficient vector corresponding to the particular beam is unity, and
  wherein the first element of the phase coefficient vector corresponding to the particular beam is zero; and
calculates no more than half of the taps for the at least one identified beam, wherein an i-th tap of the at least one identified beam is a complex conjugate of a tap for a number of subbands minus i, wherein each tap is an inverse Fourier transform of rows of time-domain coefficient vectors;
transmits CSI feedback comprising the calculated taps to the base station, wherein the CSI feedback comprises an indication of one or more elements of the vectors of amplitude coefficient vectors and phase coefficient vectors corresponding to the at least one identified beam, wherein the CSI feedback does not include the first element of the amplitude coefficient vector and the first element of the phase coefficient vector corresponding to the particular beam.

10. The apparatus of claim 9, wherein the first element of the amplitude coefficient vector corresponding to the particular beam is the greater than or equal to each of the elements of the amplitude coefficient vectors corresponding to all identified beams.

11. The apparatus of claim 9, wherein the processor reports an index corresponding to the particular beam.

12. The apparatus of claim 11, wherein the reported index is identified based on a summation of the magnitude values of elements of input vectors, wherein the input vectors are input to the Fourier-based transformation, and wherein each input vector corresponds to an identified beam.

13. The apparatus of claim 9, wherein the particular beam is identified based on a summation of the magnitude values of elements of input vectors, wherein the input vectors are input to the Fourier-based transformation, and wherein each input vector corresponds to an identified beam.

14. The apparatus of claim 9, wherein transforming the set of reference signals includes normalizing amplitude coefficient vectors of the identified set of beams based on the first element of the amplitude coefficient vector of the particular beam.

15. The apparatus of claim 9, wherein transforming the set of reference signals includes subtracting the first element of the phase coefficient vector of the particular beam from the phases of the identified set of beams.

16. The apparatus of claim 9, wherein transforming the set of reference signals includes quantizing the amplitude and phase coefficients of the identified set of beams.

* * * * *